US011736501B2

(12) United States Patent
Crouch et al.

(10) Patent No.: US 11,736,501 B2
(45) Date of Patent: Aug. 22, 2023

(54) METHOD, SYSTEM, AND APPARATUS FOR SECURITY ASSURANCE, PROTECTION, MONITORING AND ANALYSIS OF INTEGRATED CIRCUITS AND ELECTRONIC SYSTEMS USING MACHINE LEARNING INSTRUMENTS AND MACHINE LEARNING ANALYSIS

(71) Applicant: Amida Technology Solutions, Inc., Washinton, DC (US)

(72) Inventors: Alfred Larry Crouch, Cedar Park, TX (US); Peter Lawrence Levin, Silver Springs, MD (US); John David Akin, Plano, TX (US); Adam Wade Ley, Allen, TX (US); Matthew McKinnon Ritonia, Arlington, VA (US); Wesley Layton Ellington, Dallas, TX (US); Maria Anne Spasojevic, Palo Alto, CA (US)

(*) Notice: Subject to any disclaimer, the term of this patent is extended or adjusted under 35 U.S.C. 154(b) by 473 days.

(21) Appl. No.: 17/134,438

(22) Filed: Dec. 27, 2020

(65) Prior Publication Data

US 2022/0030013 A1     Jan. 27, 2022

Related U.S. Application Data

(60) Provisional application No. 63/056,349, filed on Jul. 24, 2020.

(51) Int. Cl.
| | |
|---|---|
| *H04L 9/40* | (2022.01) |
| *G06N 5/04* | (2023.01) |
| *G06F 16/23* | (2019.01) |
| *G06N 20/00* | (2019.01) |
| *G01S 19/23* | (2010.01) |
| *G01S 19/42* | (2010.01) |

(52) U.S. Cl.
CPC .......... *H04L 63/1416* (2013.01); *G01S 19/23* (2013.01); *G01S 19/42* (2013.01); *G06F 16/2379* (2019.01); *G06N 5/04* (2013.01); *G06N 20/00* (2019.01)

(58) Field of Classification Search
None
See application file for complete search history.

(56) References Cited

U.S. PATENT DOCUMENTS

2020/0327237 A1*   10/2020   Shakarian ............... G06F 17/18

* cited by examiner

*Primary Examiner* — Cai Y Chen
(74) *Attorney, Agent, or Firm* — Artie Pennington Law Offices, PLLC; Artie Pennington; Hannah Ward

(57) ABSTRACT

A method and system for analysis of a facility may include providing an emulation host system, generating a pristine circuit model on the emulation host system, inserting a first hardware trojan model, emulating operation of the golden circuit model, and emulating operation of the first hardware trojan model, and determine a set of machine-learning models, detecting the presence of an unknown trojan as a function of the set of machine learning models.

10 Claims, 8 Drawing Sheets

METHOD, SYSTEM, AND APPARATUS FOR SECURITY ASSURANCE, PROTECTION, MONITORING AND ANALYSIS OF INTEGRATED CIRCUITS AND ELECTRONIC SYSTEMS USING MACHINE LEARNING INSTRUMENTS AND MACHINE LEARNING ANALYSIS

CROSS-REFERENCE TO RELATED APPLICATIONS

This application is related to U.S. Provisional Patent Application Ser. No. 63/056,349, filed 24 Jul. 2020, entitled Method and Apparatus for Using Embedded Instruments to Facilitate Machine Learning for Trojan Detection, Mitigation, and Elimination (the "Parent Provisional Application").

This application claims priority to the Parent Application and hereby claims benefit of the filing dates thereof pursuant to 37 CFR § 1.78(a)(4).

The subject matter of the Parent Application is expressly incorporated herein by reference.

STATEMENT REGARDING FEDERALLY SPONSORED RESEARCH OR DEVELOPMENT

This invention was made with government support under N00178-17-C-1318 and N68335-19-C-0259 awarded by the Small Business Innovation Research ("SIBR"). The government has certain rights in the invention.

FIELD OF THE INVENTION

The disclosure relates to integrated circuits, integrated circuit security and electronic systems emulation. More specifically, the present invention relates to the collection of data from integrated circuits and/or electronic systems that may contain inherent malicious content known as Trojans where that collected data may be analyzed and resolved using computer based or neural-network based machine learning ("ML") techniques.

BACKGROUND OF THE INVENTION

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive Boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

Electronic systems and facilities including circuits such as integrated circuits, chips, circuit boards, electronic devices, and components thereof, are subject to attacks and intrusions from malicious content or hardware trojans (hereinafter, collectively "hardware trojans"). As used herein, the term "hardware trojan" includes inherent malicious content or elements that may be included in a facility, and that may be exploited. For clarity, hardware trojans, as referenced herein, are to be distinguished from software trojans and related malicious software.

Hardware trojans, for example, may intend to function to break or prevent normal operation, allow unauthorized taking over or locking, steal data, steal circuit structure, degrade the hardware, degrade circuit operations, or inject errors into data being processed. A non-exhaustive listing of labels or references for hardware trojans includes, without limitation, the following: "denial of service" (DoS) indicating preventing the integrated circuit from conducting its normal function for some period of time; "ransomware" indicating the taking over or locking of an integrated circuit until a payment is extracted; "data theft" indicating that critical information stored or processed within the integrated circuit has been exfiltrated (such as, for example, customer information, account numbers and account passwords that can be used for identity theft and to access financial accounts); "structure theft" indicating that design or operation information concerning the electronic system or facility thereof has been exposed to enable reverse-engineering or counterfeiting; and "destructive operation" indicating that a facility or electronic system may be operated in such a manner as to provide physical damage (for example, operating built-in self-test logic (BIST) until a facility goes into thermal overload and physically melts).

The capability to allow these types of attacks stems from inadvertent or intentionally malicious content (i.e., "hardware trojans") included within the facility hardware, such as integrated circuit hardware. Instantiations of malicious content, both inadvertent and intentional, may be labeled or referenced by several names, but may be generally referred to as "security vulnerabilities" or "security exploits" (hereinafter, collectively, "security exploits"). Security exploits may be incorporated within a facility, or within an electronic system including a facility, at any point in design, development, integration, implementation, testing, programming, packaging, and distribution; or at any point in the design-manufacturing-distribution supply chain.

In the age of the internet, the internet-of-things ("IoT"), and ubiquitous home and business electronics, the prevalence of cyberattacks has become a key concern of many owners and users of those electronics. Many attacks source from, and make use of, the connection to the internet. Often overlooked, however, are the hardware trojans hidden, and embedded, and/or built right into the electronic hardware, i.e., trojan attacks. A trojan attack is the inclusion of hardware trojans within an electronic device. The trojan attack becomes realized when the trojan is activated and delivers its designated payload or takes its designated action. Trojans may be "always on" or may be triggered or activated by an event.

Modern electronic systems are used ubiquitously within many different industries and segments of society. A disaggregated supply chain, of which many elements reside within foreign countries that are not aligned with the interests of the United States, results in many opportunities to add nefarious content to the semiconductors and electronics that go into those ubiquitous products and systems. Of particular concern are electronics that are in critical safety and infrastructure systems and may have a questionable root of trust—military/government electronic systems, automotive or avionic systems, medical systems and infrastructure systems such as the power grid, water and wastewater processing and traffic control systems. Embedded Trojans and counterfeit electronics provide back door access and event-based triggers that can result in an impact to the mission mode through the disabling, take-over, degradation and corruption of those electronic devices and systems; or can result in the insertion of malware or an attack on the reputation or the reverse engineering of devices or systems through infiltration or exfiltration of code, states, data or structure.

When systems are assembled and delivered as products, both the provider of the electronic system and the user of the electronic system are concerned that the electronics represent what was intended. The technical field involving the verification of the electronics is known as Hardware Assurance. For example, the question can be asked of the silicon returned from a manufacturing foundry—"Is the silicon device I am receiving back from manufacturing, in fact, a match to what I sent to be manufactured?" There are many forms of verification of hardware assurance, most involving test, debug, or yield-analysis. For example, the application of functional or structural vectors to verify that the device commits all of the actions outlined in the device specification or that the truth tables of gates and connections of wire routes all match the physical layout model. However, a Trojan can be viewed as a "defect, fault or error installed by a human intelligence as opposed to an imperfect design, development or manufacturing process". The human intelligence part is generally applied to add a level of stealth (to hide the Trojan) so that the change or modification that produces the Trojan and its trigger will not easily be found by the normal test, debug and yield-analysis processes. To this end, the Hardware Assurance process, with reference to hardware Trojans and counterfeit devices, requires extended analyses and techniques above and beyond the normal device test, characterization and verification processes.

Several of the applicants have developed certain improvements for use in the cybersecurity systems, which improvements are fully described in the following pending applications or issued patents, all of which are expressly incorporated herein in their entirety:

"Method, System and Apparatus for Security Assurance, Protection, Monitoring and analysis of Integrated Circuits and Electronic Systems in Relation to Hardware trojans", application Ser. No. 16/145,891, filed 28 Sep. 2018;

"Method, System and Apparatus for Security Assurance, Protection, Monitoring and analysis of Integrated Circuits and Electronic Systems in Relation to Hardware trojans", application Ser. No. 16/450,336, filed 24 Jun. 2019;

"Method and System for Selection of Location for Placement of Trojans, Triggers and Instruments within Integrated Circuits and Electronic Systems using Contributory Operation Analysis", application Ser. No. 16/732,236, filed 31 Dec. 2019; and "Method and System for Selection of Location for Placement of Trojans, Triggers and Instruments within Integrated Circuits and Electronic Systems using Weighted Controllability and Observability Analysis", application Ser. No. 16/775,658, filed 29 Jan. 2020.

One method (described in previous patent disclosure) involves the use of Trojan detection instruments that can detect either the existence or operation of the activation trigger or the payload delivered by the Trojan. These are commonly known as binary instrument or detection-only monitor in that they reside in the circuit and do nothing until they detect the activity or behavior related to the activating trigger or the Trojan payload. In some cases, these instruments can then be incorporated into the manufactured design and can be used during test, verification, characterization and yield-analysis to increase the likelihood of detecting the malfeasant modifications during the normal hardware assurance process. In other cases, the monitors remain active within the device during mission mode and can provide an indicator if a detection event is positive. However, the problem with binary detection is that any given device can have tens to hundreds to thousands to even millions of potential Trojans and many of these binary monitors can only be used to detect one attack, therefore, the overhead of binary monitors could be as many as "all the possible Trojan attacks that can be predicted to be installed." This is not a very efficient system.

A previous patent disclosure also described the use of embedded instruments in conjunction with the programming of the Golden Model into an FPGA to conduct emulation, and using a trigger and Trojan insertion process to actually study the physical effect of an activating trigger and the Trojan payload. This type of evaluation also allows the analog, parametric and side-channel effects of an activating trigger and a Trojan payload to be investigated (which is often times more insightful than just conducting a digital simulation). The programmable FPGA-based emulation provides a sandboxed environment to safely study activating triggers and Trojan payloads and can produce results that are more in line with real-time operation (as opposed to the extreme slowness involved with digital simulation).

This method can provide some brute force methods of tracing the Trojan payload effects and determining where to put the detection monitors. For example, if a secret code is embedded within the device and is processed by a logical unit, and a nefarious individual attached an extra wire from the code processing unit to an unused output port, then when triggered, the unused output port can "leak" or "exfiltrate" the data through the unused port. Understanding which port, what type of protocol the port uses, and the nature of the "leaking data" can identify what type of instrument to place either at the port or along the path to the port. Trojans can be evaluated for their "importance" and pathways can be evaluated for the "best locations" to detect multiple Trojans with one instrument. However, even with this system in place, the analysis time may be a "schedule impact" during the design of the semiconductor device as many possible Trojans may need to be inserted and operated and evaluated and then instruments can be inserted into the design and evaluated as to their efficacy.

A system is needed that more automates this selection and evaluation of instruments and the production of results so the monitors and instruments can be included within the device during the design process; and instrument that are more efficient than "one per potential Trojan" can be developed and used to minimize schedule impact and the area, power, timing and other physical cost factors involved with adding cybersecurity evaluation elements to the semiconductor or electronic device.

For reasons stated above and for other reasons which will become apparent to those skilled in the art upon reading and understanding the present specification, there is a need in the art for improved methods, systems, and apparatus for security assurance, protection, monitoring and analysis of facilities and electronic systems including circuits, such as integrated circuits, in relation to hardware trojans.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In accordance with an embodiment a method including the steps of operating an electronic facility comprising a machine learning ("ML") instrument by applying operational vectors, the ML instrument being adapted to store operational data associated with a first functional circuit block, receiving the operational data from the machine learning instrument, the operational data being further characterized as normal operational data, developing a normal signature as a function of the normal operational data, storing said normal signature in a signature database, inserting a first trojan into said electronic facility at a location selected to produce anomalous behavior, operating said electronic facility by applying operational vectors and a first trojan trigger, receiving said operational data from said learning instrument, said operational data being further characterized as infected operational data, developing an infected signature as a function of said infected operational data, storing said infected signature in said signature database; inserting a second trojan into said electronic facility at a location selected to produce anomalous behavior, operating said electronic facility by applying operational vectors and a second trojan trigger receiving said operational data from said learning instrument, said operational data being further characterized as unknown operational data, detecting anomalous behavior of said unknown operational data developing a prediction metric as a function of said unknown operational data, said normal signature, and said infected signature storing said prediction metric in a prediction database.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein.

Figure 1:
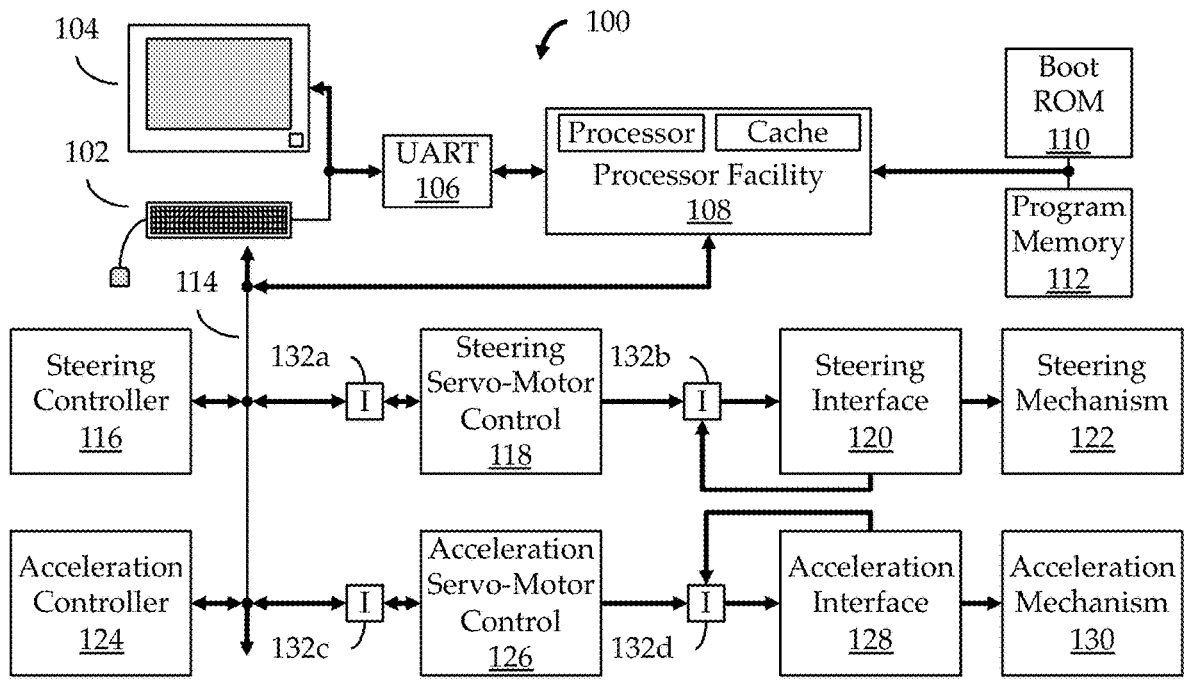
FIG. 1 illustrates, in block diagram form, an exemplary electronic facility that may be the subject of the aforementioned trojan attacks, and to the analytical methods described herein according to some embodiments.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

In this detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

FIG. 1 illustrates, in block diagram form, an exemplary electronic facility 100 that may be the subject of the aforementioned trojan attacks, and to the analytical methods described herein according to some embodiments. Electronic facility 100 is generally representative of electronic facilities that may be available in marine vessels, aircraft, and automobiles, and includes the digital and analog components of an exemplary directional control (steering) system and a throttle control (acceleration) system. Electronic facility 100 may include an interface that comprises keyboard 102, monitor 104, and Universal Asynchronous Receiver/Transmitter ("UART") 106. Electronic facility 100 may also include processor facility 108 that interfaces with keyboard 102 and monitor 104 by way of UART 106, as well as interfacing with boot Read Only Memory ("ROM") 110, program memory 112, and with bus 114. Electronic facility 100 may also include an exemplary steering controller 116 that communicates with bus 114 and with steering servo-motor control 118. Steering servo-motor control 118 communicates with the steering mechanism 122 via the steering interface 120. Similarly, acceleration controller 124 communicates with bus 114 and with acceleration servo-motor control 126. Acceleration servo-motor control 126 communicates with acceleration mechanism 130 via the acceleration interface 128. ML instruments 132[a-d] have been inserted into electronic facility 100 and capture operational data that result from applying operational vectors to electronic facility 100 to exercise all fundamental operations.

Figure 2:
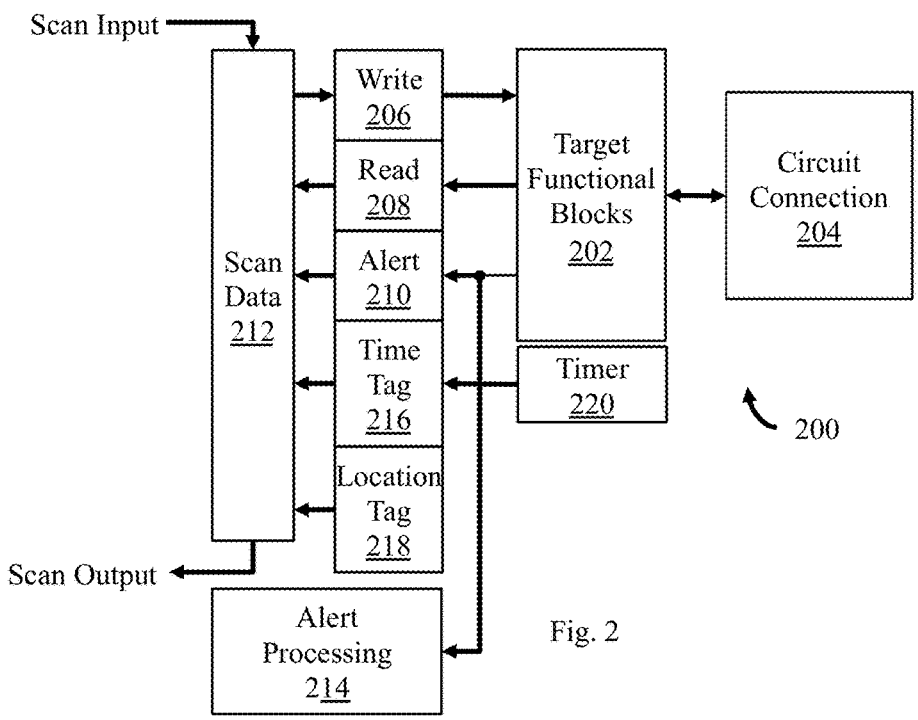
FIG. 2 illustrates, in block diagram form, a ML instrument adapted to capture and export the sample data generated by the application of vectors to the electronic facility of FIG. 1.

ML instruments 132[a-d] may be better understood by referring to the exemplary ML instrument 200 of FIG. 2. The ML instrument 200 of FIG. 2, illustrated in block diagram form, is adapted to capture and export the sample data generated by the application of vectors to the electronic facility 100 of FIG. 1. ML instrument 200 is designed to capture expected data or states, i.e., progression of data values, progression of states, responses of the instrumented circuit to applied stimulus, etc., over a period of time. By way of example, and without limitation, ML instrument 200 may be coupled to a counter within the electronic facility 100, and the ML instrument 200 may learn or record the start state, the progression of the count, the end state, the elapsed time for the desired count, and the action of the counter upon reaching the end state, i.e., the counter may return to an initial state, convert to count down, or freeze until a reset signal is received by the counter. ML instrument 200 may include functional blocks 202 that are designed to capture specific data regarding the block or blocks that are monitored by ML instrument 200. By way of example, and without limitation, target functional block 202 may include a hardware voltage sampler (not shown) that periodically samples and records an analog voltage level, e.g., the power supply or ground supply in electronic facility 100. Alternatively, target functional block 202 may include an accumulator (not shown) and a memory (not shown) coupled to the aforementioned hardware voltage sampler (not shown) for the purpose of averaging a digital or analog value over time and storing those value in the memory. One of ordinary skill in the art will understand the broad spectrum of functions that may be included in target functional block 202. ML Instrument 200 may be of various types, including without limitations, targeted historical instruments, time-framing instruments, hardware assertion instruments, back-door instruments, and unused element instruments. ML instrument 200 may also include a circuit connection block 204, a register write field 206, register read field 208, register alert field 210, a time tag 216 that received time stamp information from timer 220, a location tag 218, and may also include an interface to the scan chain in the system, here represented by scan data 212. During operations, each sample acquired by the hardware voltage sampler of the target functional block 202 may be stored along with outputs of the accumulator and later retrieved by way of scanning the data out of electronic facility 100 via the scan data 212. ML instrument 200 will also develop a time tag 216 for each sample of data scanned out by way of scan data 212 as well as have a location tag 218 that provides a location of the ML instrument within the electronic facility 100. ML instrument 200 may be interfaced via circuit connection 204 with various analog or digital devices, and may be utilized to detect various trojan attacks of a type digital, analog, parametric, or side-channel devices, e.g., capture or develop operational data that may be further characterized as comprising at least one of temperature, voltage, power consumption, supply voltage variation, ground voltage variation, and timing degradation.

Figure 3:
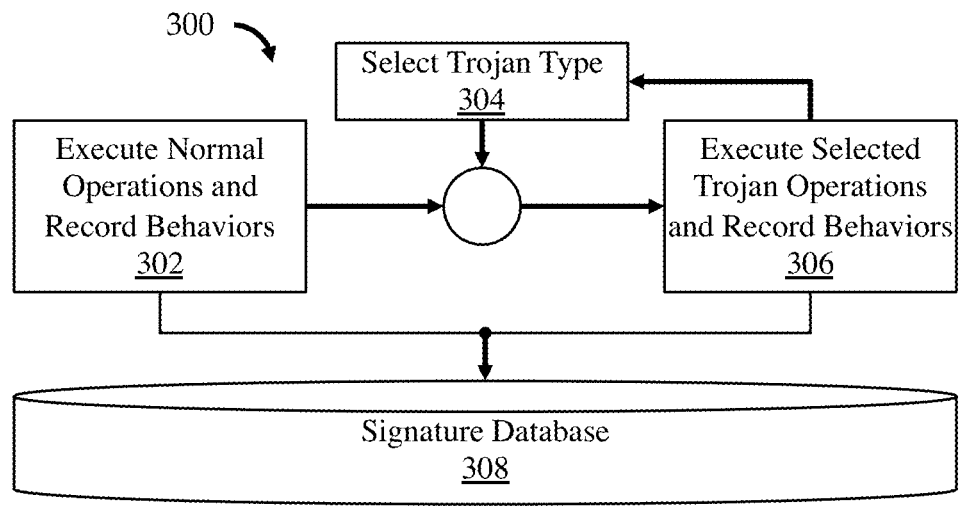
FIG. 3 illustrates, in flow chart form, a training data production process according to some embodiments.
Figure 4:
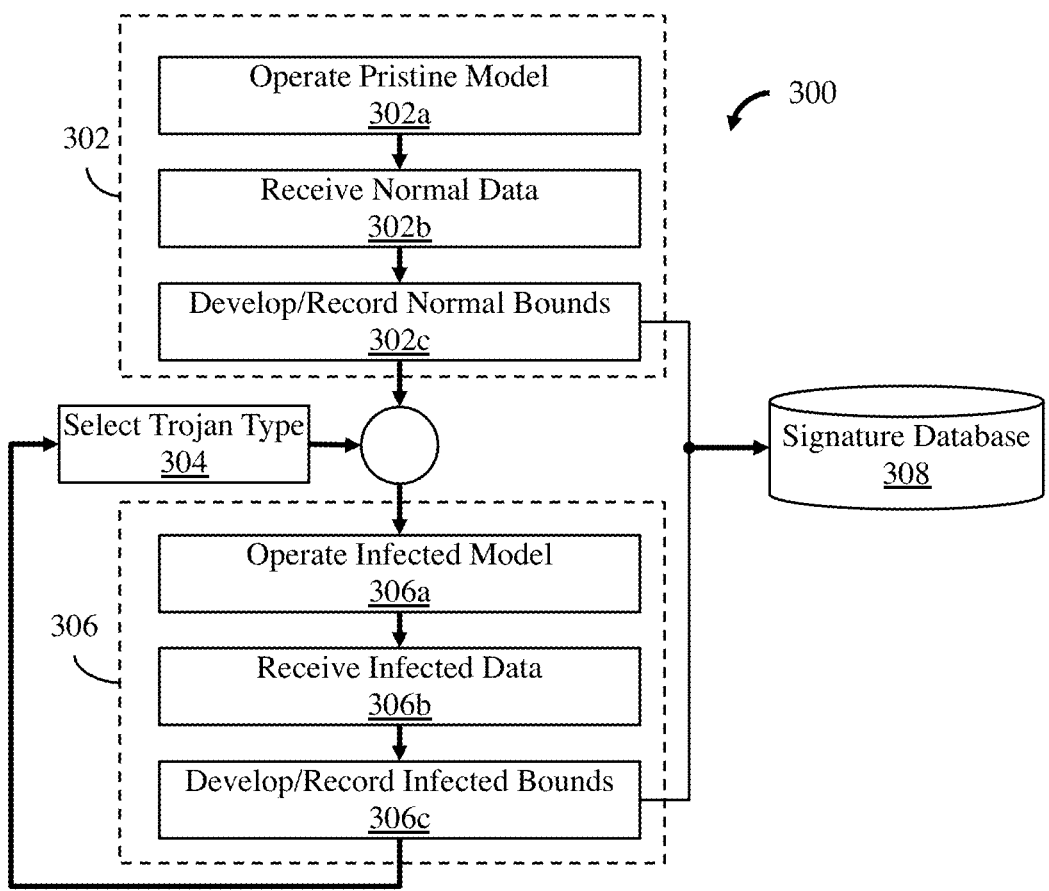
FIG. 4 illustrates, in flow chart form, the data production and training process of FIG. 3 in an expanded form according to some embodiments.
Figure 5:
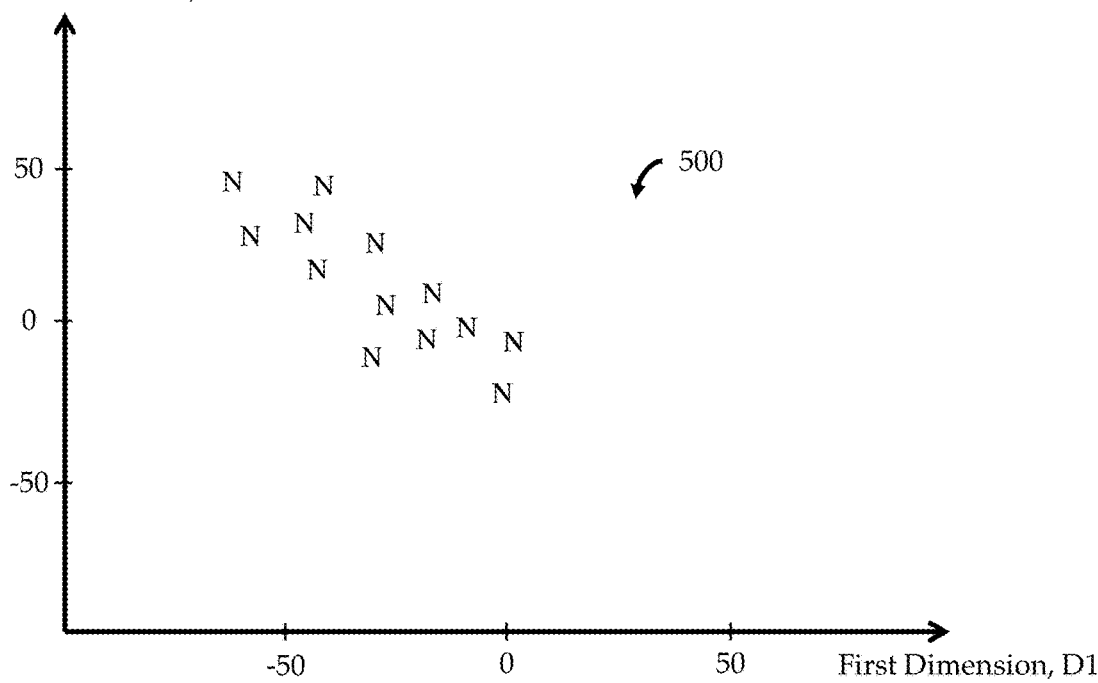
FIG. 5 illustrates, in graph form, a plot of normal operation variables according to some embodiments.

FIG. 3 illustrates, in flow chart form, a training data production process 300 according to some embodiments. FIG. 4 illustrates, in an expanded flow chart form, the data production or training process 300 of FIG. 3 according to some embodiments. Detection and identification of hardware trojans within a specific electronic facility begins with obtaining an understanding of normal operations of that specific electronic facility. Normal operations of electronic facility 100 can be understood by first obtaining and characterizing operational data. This operational data may be obtained by way of ML instruments 132[a-d]. ML instruments 132[a-d] are each associated with a particular functional circuit block within electronic facility 100, e.g., ML instrument 132a is associated with operational data traversing the bus 114 to and from steering controller 116 and processor facility 108 to steering servo-motor control 118. ML instrument 132b is associated with and captures data traversing from steering servo-motor control 118 to steering interface 120 as well as capturing data feedback from steering interface 120. Electronic facility 100 may be operated using register transfer language ("RTL") models that are of known pristine quality and ML instruments may be instantiated within electronic facility 100 to capture data associated with the normal operations of the pristine model, i.e., without hardware trojans. (see, FIG. 4, step 302a) Operation of this pristine model generates data that is captured by the ML instruments 132[a-d]. This data is received or extracted from hardware embedded ML instruments 132[a-d] through industry standard JTAG/IJTAG. (see, FIG. 4, step 302b) This serial JTAG data is converted into a usable data format and various variable fields, e.g., XML variables. By way of example, variables may be defined as an N bit field of the serial JTAG data, where the N bit field is segmented into several subfields, each defining a specific field of interest. In some embodiments, one of the N bit fields may be the steering FIFO output monitor, defined as a 50 bit field comprising the instrument ID as bits 49-42, the instrument location designation as bits 41-34, overflow as bit 33, full as bit 32, almost full as bit 31, underflow as bit 30, empty as bit 29, almost empty as bit 28, the FIFO fill count as bit 27-18, data tag as bits 17-10, and steering data from the processor as bits 9-0. Other variable fields are contemplated. These variables and their cohorts are analyzed to develop the bounds of normal operation and are then stored in signature database 308. (see, FIG. 4, step 302c) As this data for the pristine model is accumulated, each variable is determined to operate within a range that represents the normal operation of the pristine model, e.g., the temperature of the electronic facility may range between $T_{max}$ and $T_{min}$, and have an average temperature of $T_{avg}$ plus or minus some standard deviation. Another example of the normal range of a measured variable may be deflection of the steering mechanism 122. Steering mechanism 122 may maximum left and right deflection of 75 degrees at an average rate of deflection of 5 degrees per second. Other variables are contemplated such as power consumption, switching activity, data corruption, timing degradation, operative integrity, light emission, vibration, signal corruption, supply voltage variation, ground voltage variation, and the like. According to some embodiments, the data may contain upwards of 200 variables. For the purposes of examining behavior of a system, it is often useful to view the data in "reduced" space, e.g., algorithmically projecting high dimension variables into a new vector space. Examples of algorithmic analysis of high-dimensional data are algorithms such as Principal Component Analysis ("PCA") and t-distributed Stochastic Neighbor Embedding ("t-SNE"). FIG. 5 illustrates, in graph form, a plot of normal operation variables 500 according to some embodiments. Plot 500 is an illustrative plot of several variables, here illustrated as various "N", on a reduced, 2-dimensional plot and may demonstrate a "normal" signature of different variables within electronic facility 100.

There are three fundamental canonical attacks that may be performed by various trojans: (i) a behavior modification attack, where the hardware trojan seeks to alter how the device operates; (ii) a leaker attack; where the hardware trojan seeks to infiltrate or exfiltrate information; and (iii) a reliability impact attack, where the hardware trojan seeks to reduce the lifetime of the system, i.e., electronic facility 100. Each of these may be further broken down in to specific types. By way of example, a behavior modification attack may be a kill-switch or denial-of-service attack that seeks to prevent an important mission mode feature of the system. A behavior modification attack may be a take-over attack that allows an alternate master to control the device or mission mode feature. A behavior modification attack may be an alternate-operation attack that substitutes an alternate feature for an important mission mode feature. Other forms of behavior modification attacks, leaker attacks, and reliability impact attacks are contemplated and would be understood by one of ordinary skill. Referring back to FIG. 4, upon establishing a baseline for pristine model normal operations and storing the signatures and associated variables in signature database 308, one of these known trojan types is selected and inserted in the electronic facility 100 to form an infected model. (see, FIG. 4, step 304.)

Figure 6:
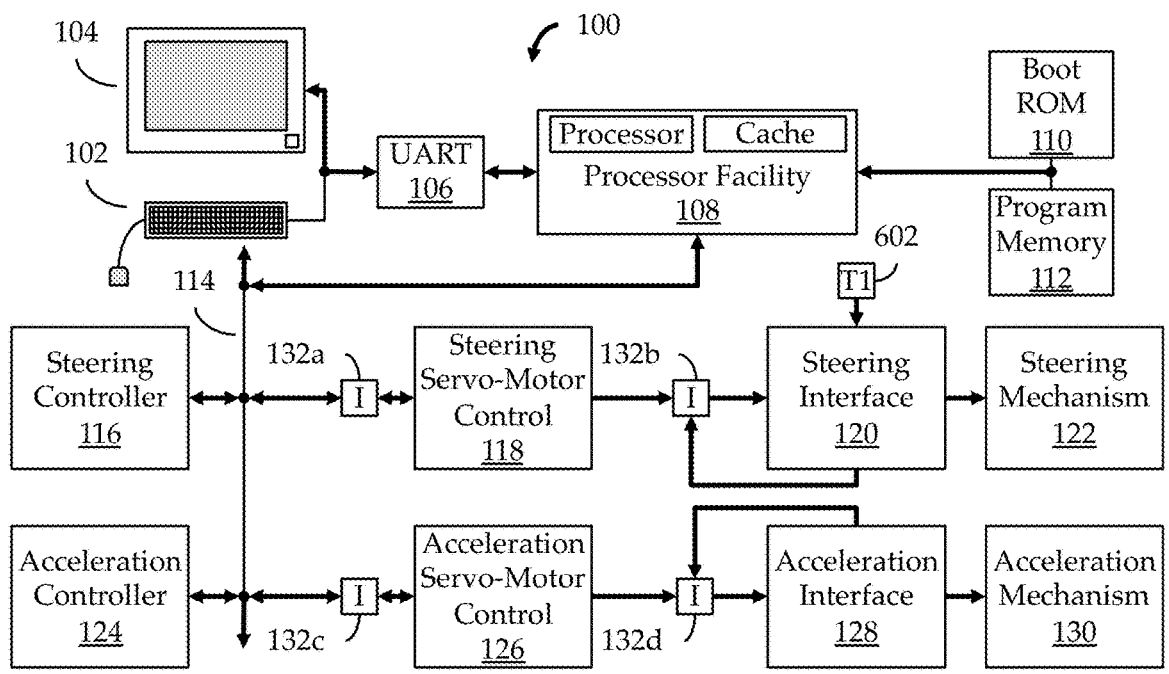
FIG. 6 illustrates, in block diagram form, the exemplary electronic facility of FIG. 1 infected with a selected hardware trojan inserted, according to some embodiments.

FIG. 6 illustrates, in block diagram form, the exemplary electronic facility 100 of FIG. 1 now infected with a selected trojan inserted, according to some embodiments. Electronic facility 100 includes all of the previously discussed logic blocks and busses, and now includes hardware trojan 602, here illustrated as "T1", selected by way of selection step 304 of FIG. 4. The infected operations of electronic facility 100 can be understood by, again, obtaining and characterizing operational data. This operational data may be obtained by way of ML instruments 132[a-d].

Figure 7:
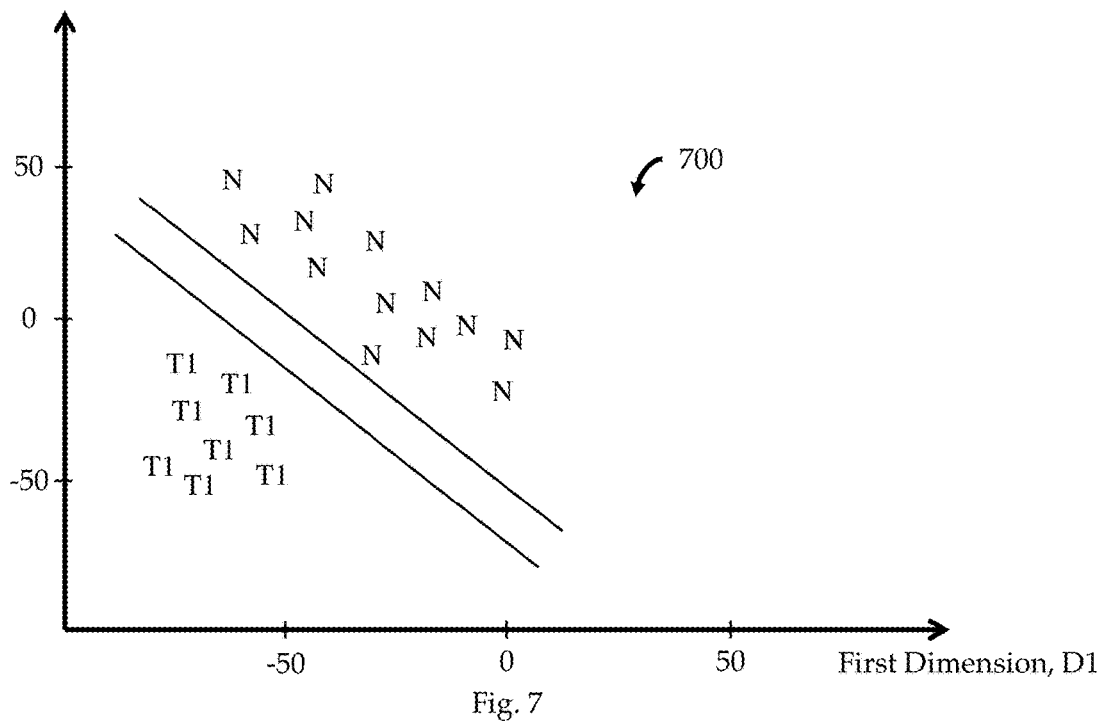
FIG. 7 illustrates, in graph form, a plot of normal operation variables and of infected operation variables according to some embodiments.

The now infected electronic facility 100 may be operated by applying operational vectors to electronic facility 100 to exercise all fundamental operations and applying triggering vectors to operate hardware trojan 602 using register transfer language ("RTL") models that are of known quality and ML instruments may be instantiated within electronic facility 100 to capture data associated with the operations of the infected model, i.e., with hardware trojans. (see, FIG. 4, step 306a.) Operation of this infected model generates data that is captured by the ML instruments 132[a-d]. This data is received or extracted from hardware embedded ML instruments 132[a-d] through industry standard JTAG/IJTAG. (see, FIG. 4, step 306b.) This serial JTAG data is converted into a usable data format and various variable fields. Once again, these variables and their cohorts are analyzed to develop the bounds of infected operation for the known trojan inserted into electronic facility 100 and are then stored in signature database 308. (see, FIG. 4, step 306c). By way of example, and without limitation, hardware trojan 602, here illustrated as "T1" in FIG. 6 may be a behavior modifier trojan, and affect the steering logic path by reversing the direct of deflection by which the steering mechanism moves, or by disabling the steering mechanism all together. Alternatively, hardware trojan 602 may alter the rate at which the steering mechanism responds to input, effectively slowing down the turn rate. Other means of behavior modifications are anticipated. FIG. 7 illustrates, in graph form, a plot 700 of normal operation variables, and of infected operation variables according to some embodiments. Plot 700 includes, on a reduced, 2-dimensional plot, normal operations, here illustrated an "N" and infected or operational variables as impacted by the selected hardware trojan 602, here illustrated as "T1". As illustrated in FIG. 7, we see separability between cohorts with respect to the various data clusters. Separability is needed to support differentiation between pristine, normal behavior and infected behavior.

Figure 8:
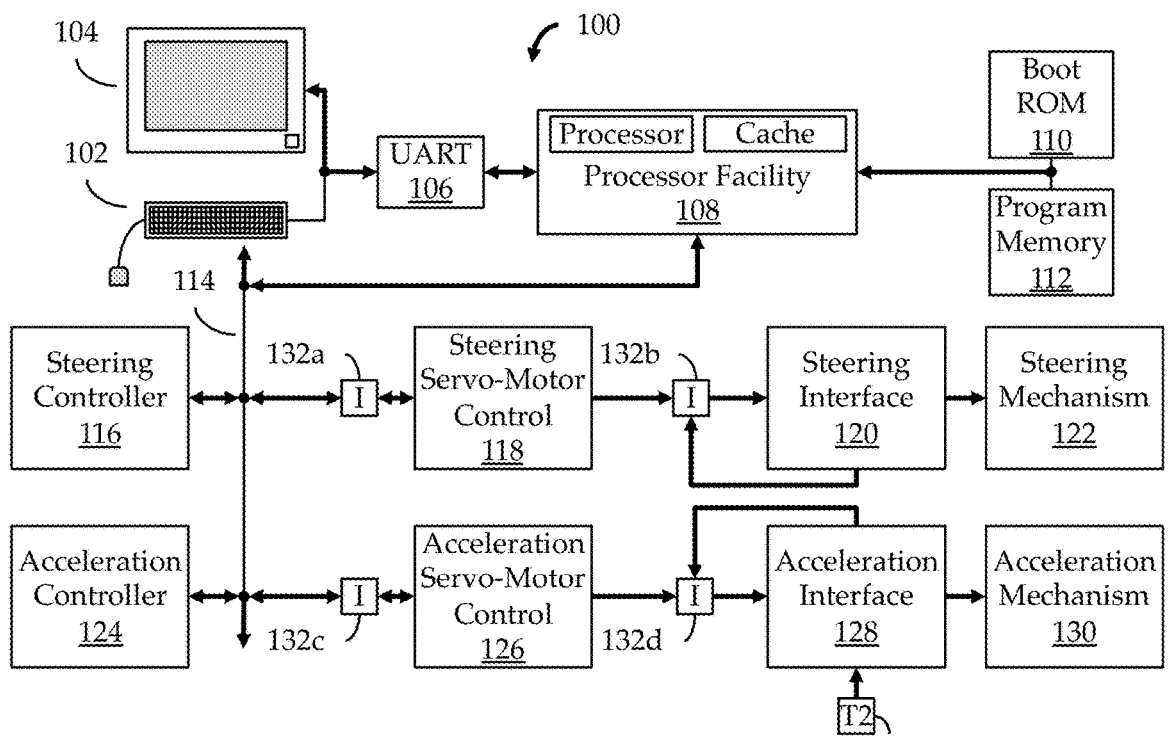
FIG. 8 illustrates, in block diagram form, the exemplary electronic facility of FIG. 1 now infected with a selected trojan inserted, different from the previous trojan of FIG. 6, according to some embodiments.

FIG. 8 illustrates, in block diagram form, the exemplary electronic facility 100 of FIG. 1 now infected with a selected trojan inserted, different from the previous trojan of FIG. 6, according to some embodiments. Electronic facility 100 includes all of the previously discussed logic blocks and busses, and now includes hardware trojan 802, here illustrated as "T2", selected by way of selection step 304 of FIG. 4. The infected operations of electronic facility 100 can be understood by, again, obtaining and characterizing operational data. This operational data may be obtained by way of ML instruments 132[a-d].

Figure 9:
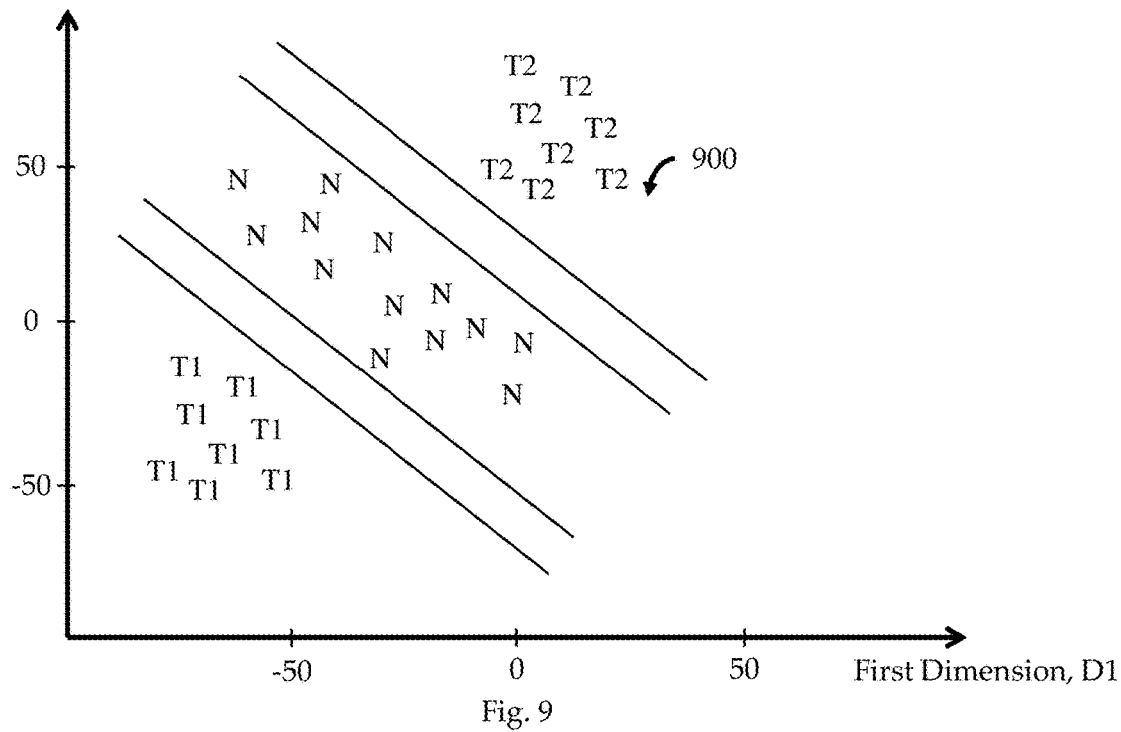
FIG. 9 illustrates, in graph form, a plot 900 of normal operation variables, and of infected operation variables according to some embodiments.

The now infected electronic facility 100 may be operated by applying operational vectors to electronic facility 100 to exercise all fundamental operations and applying triggering vectors to operate hardware trojan 802 using register transfer language ("RTL") models that are of known quality and ML instruments may be instantiated within electronic facility 100 to capture data associated with the operations of the infected model, i.e., with hardware trojans. (see, FIG. 4, step 306a.) Operation of this infected model generates data that is captured by the ML instruments 132[a-d]. This data is received or extracted from hardware embedded ML instruments 132[a-d] through industry standard JTAG/IJTAG. (see, FIG. 4, step 306b.) This serial JTAG data is converted into a usable data format and various variable fields. Once again, these variables and their cohorts are analyzed to develop the bounds of infected operation for the known trojan inserted into electronic facility 100 and are then stored in signature database 308. (see, FIG. 4, step 306c). By way of example, and without limitation, hardware trojan 602, here illustrated as "T2" in FIG. 8 may be a behavior modifier trojan, and affect the acceleration logic path by altering the rate at which the acceleration mechanism moves in response to the input of the acceleration controller, or by disabling the acceleration mechanism all together. Alternatively, hardware trojan 802 may alter the rate at which the acceleration mechanism responds to input, effectively slowing down the acceleration rate. Other means of behavior modifications are anticipated. FIG. 9 illustrates, in graph form, a plot 900 of normal operation variables, and of infected operation variables according to some embodiments. Plot 900 includes, on a reduced, 2-dimensional plot, normal operations, here illustrated an "N" and infected or operational variables as impacted by the selected hardware trojan 802, here illustrated as "T2". As illustrated in FIG. 9, we see separability between cohorts with respect to the various data clusters. Separability is needed to support differentiation between pristine, normal behavior and infected behavior.

Detecting and identifying known trojans as well as detecting and classifying previously unknown trojans in electronic facility 100 requires application of machine learning algorithms to the data collected from the hardware as illustrated in the training data production process 300 of FIG. 3. Detection requires differentiation of non-infected and trojan-infected pristine circuit operation, e.g., is the hardware operating abnormally. Identification requires association of detected anomalous behavior with at least one known trojan signature.

The goal of trojan detection model is to differentiate between normal and anomalous behavior in the hardware. For trojan detection we have selected a novelty detection approach. Novelty detection is a form of semi-supervised machine learning that is used for anomaly detection, wherein the training data is not polluted by outliers and we are interested in detecting whether a new observation is an outlier. For novelty detection, algorithms such as robust covariance, local outlier factor, and isolation forest are used with the normal dataset and the T1 and T2 datasets to maximize the space between datasets during training. If an observation is determined to be anomalous by the detection model, then it is passed to the trojan identification model. The goal of the identification model is to classify the observation as belonging to, or being analogous to, one of a set of known trojan behaviors. For the identification, algorithms that assign new observations to previously defined cohorts based on similar attributes are used, e.g., random forest, logistic regression, and neural network.

Figure 10:
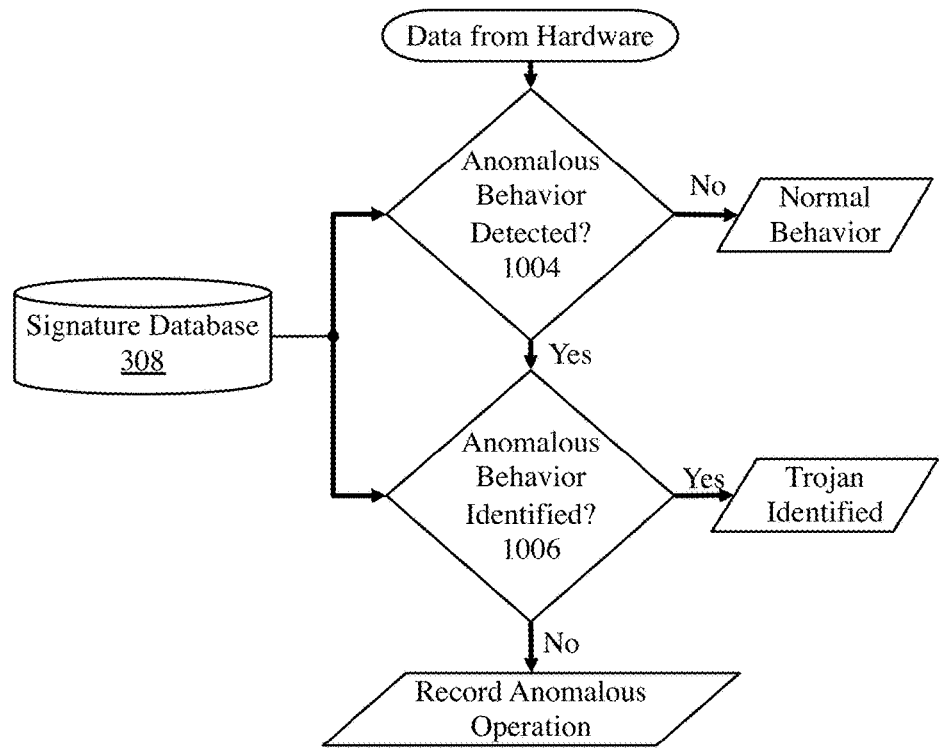
FIG. 10 illustrates, in flow diagram form, an exemplary method for utilizing the detection model and the identification model according to some embodiments.

FIG. 10 illustrates, in flow diagram form, an exemplary method for utilizing the detection model and the identification model according to some embodiments. Data is serially scanned from electronic facility 100 and provided to the detection model 1004. Detection model 1004 evaluates the incoming data as against the normal models and normal signatures stored in signature database 308. An indication that no anomalous behavior is present ends the process and the method may start again once new data is received from the hardware, i.e., scanned out via ML instruments 132[a-d]. An indication that anomalous behavior is present, the identification step 1006 then evaluates the incoming data against the various trojan models and signatures stored in signature database 308.

Figure 11:
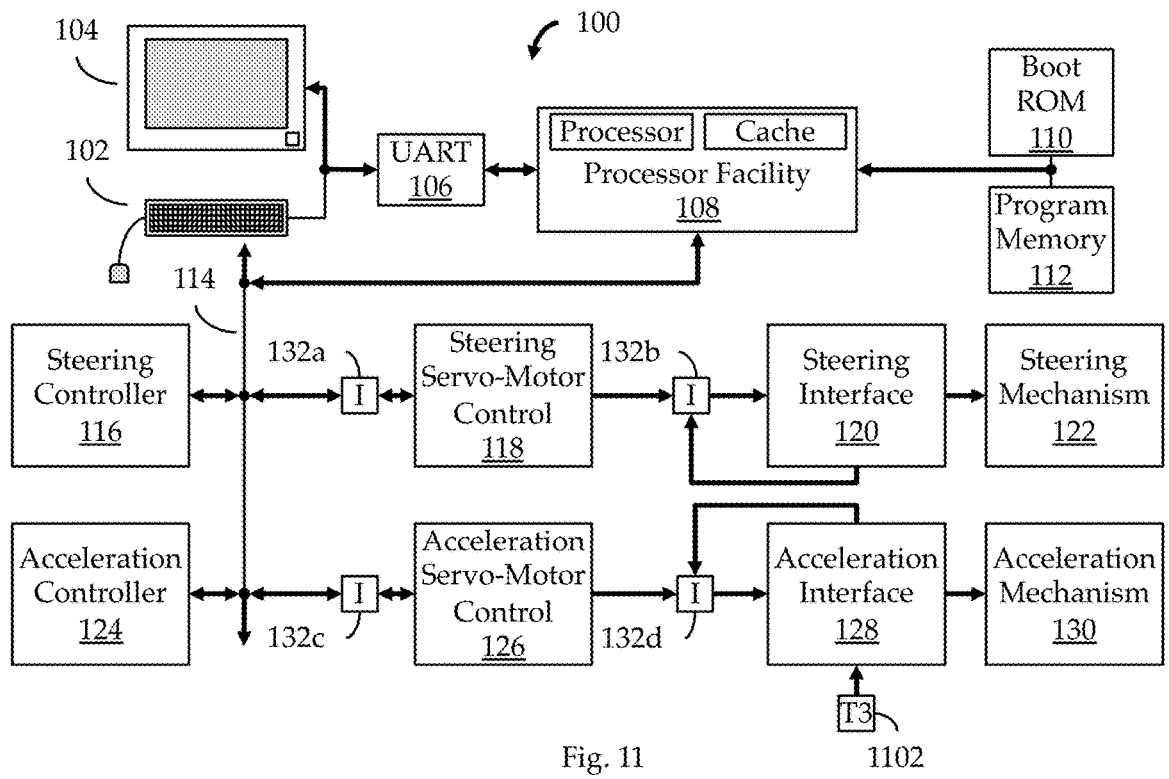
FIG. 11 illustrates, in block diagram form, the exemplary electronic facility of FIG. 1 now infected with a selected trojan inserted, different from the previous trojans of FIG. 6 and FIG. 8, according to some embodiments.

FIG. 11 illustrates, in block diagram form, the exemplary electronic facility 100 of FIG. 1 now infected with an unknown trojan inserted 1102, and different from the previous trojans of FIG. 6 and FIG. 8, according to some embodiments. Electronic facility 100 includes all of the previously discussed logic blocks and busses, and now includes unknown hardware trojan 1102, here illustrated as "T3". The infected operations of electronic facility 100 can be understood by, again, obtaining and characterizing operational data. This operational data may be obtained by way of ML instruments 132[a-d].

Figure 12:
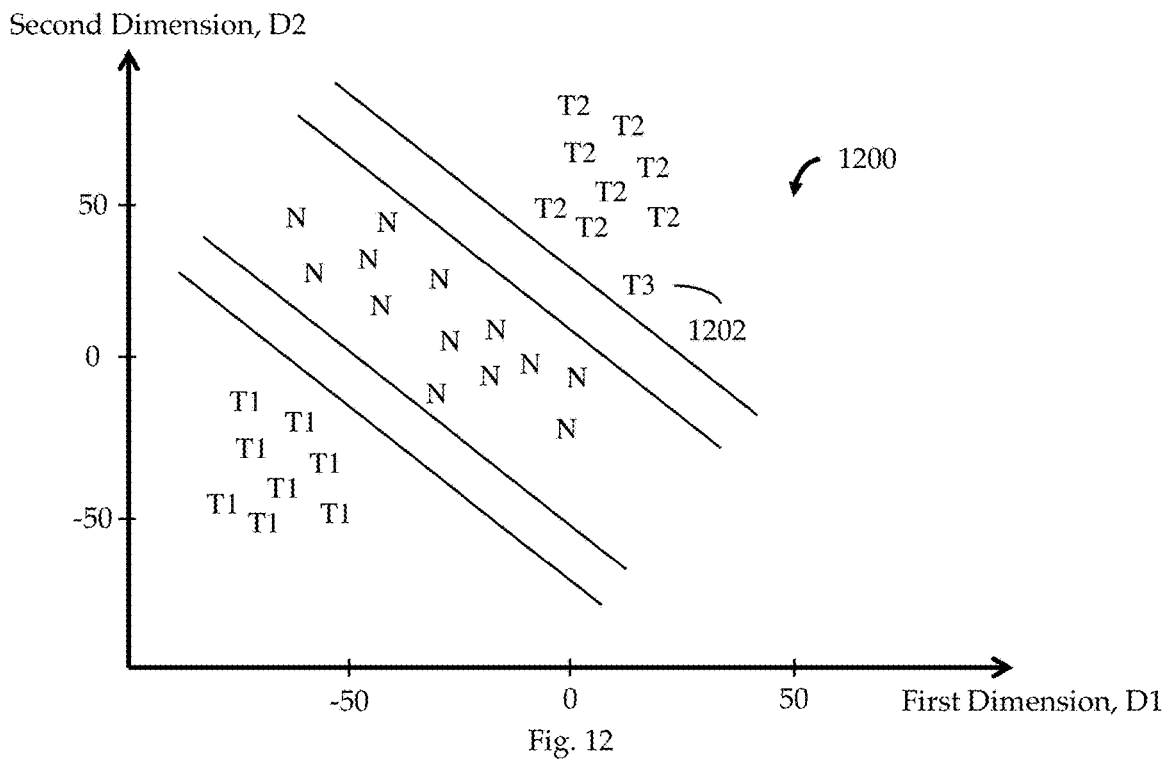
FIG. 12 illustrates, in graph form, a plot 1200 of normal operation variables, and of infected operation variables according to some embodiments.

The now infected electronic facility 100 may be operated by applying operational vectors to electronic facility 100 to exercise all fundamental operations and applying triggering vectors to operate hardware trojan 1102 using register transfer language ("RTL") models that are of known quality. As before, ML instruments may be instantiated within electronic facility 100 to capture data associated with the operations of the infected model, i.e., with unknown hardware trojan 1102. (see, FIG. 4, step 306a.) Operation of this infected model generates data that is captured by the ML instruments 132[a-d]. As before, this data is received or extracted from hardware embedded ML instruments 132[a-d] through industry standard JTAG/IJTAG. (see, FIG. 4, step 306b.) This serial JTAG data is converted into a usable data format and various variable fields. Once again, these variables and their cohorts are analyzed to develop the bounds of infected operation for the unknown trojan 1102. The bounds of the data associated with the unknown trojan 1102 are evaluated using the novelty detection approach to detect anomalous behavior, e.g., comparing the unknown trojan 1102 data against the signature data stored in signature database 308. (see, FIG. 10, step 1004.) Initially, the data associated with the unknown hardware trojan 1102 is evaluated against the signature stored for "normal" operations of the electronic facility 100 in signature database 308, e.g., the "normal" signature. (see, FIG. 4, step 302c). Anomalous behavior is considered present where the unknown trojan 1102 data for a particular variable or set of variables significantly deviates from the normal signature or model(s). The identification model is then applied to the unknown trojan 1102 data to determine if it is more closely associated with a known hardware trojan, e.g., T1 or T2, or if the unknown trojan 1102 data is a completely new trojan. (see, FIG. 10, step 1006.) By way of example, unknown hardware trojan 1102, here illustrated at "T3" in FIG. 11 may be another behavior modifier trojan, effecting the acceleration logic path by altering the rate at which the acceleration mechanism moves in response to the input of the acceleration controller, or by disabling the acceleration mechanism all together. FIG. 12 illustrates, in graph form, a plot 1200 of normal operation variables, and of infected operation variables according to some embodiments. Plot 1200 includes, on a reduced, 2-dimensional plot, normal operations, here illustrated an "N" and infected or operational variables previously trained, here illustrated as "T1" and "T2". When the model is applied to unknown hardware trojan 102 data, the identification model places the "T3" data in close proximity to the "T2" cluster, and substantially separated from the normal data "N" and the "T1" cluster. (see, FIG. 12, 1202). Detection and identification of other data and other data models are anticipated. By way of example, after detection and identification, a correlation of location tag or tags of specific ML instrument(s) may implicate a particular cone of logic within electronic facility 100 that contains the unknown trojan 1102. Certain embodiment may also utilize both ML instrument(s) and scan diagnostics to ascertain the location of certain trojans such as unknown trojan 1102. Activation time may also be ascertained using ML instruments 132[a-d] by utilizing the information contained in time tag 220 of FIG. 2.

The U.S. Global Positioning System ("GPS") is part of a network of global navigation satellite systems ("GNSS") and its signals are vulnerable to attack. GPS spoofing is an attack in which a radio transmitter located near the target is used to interfere with a legitimate GPS signal. The attacker could transmit no data at all, or could transmit inaccurate coordinates. GPS/GNSS is also used for accurate timing and attackers can interfere with that function as well. These types of attacks can be accomplished using inexpensive, commercially available, and portable software-defined radios running open source software. In the most common example, an attacker may position a broadcast antenna pointed toward a target's GPS receiver antenna, thus interfering with GPS signals of nearby buildings, ships, automobiles, or aircraft. GPS spoofing may also be deployed via drones or carried onto an airplane by a passenger. GPS spoofing has been reported globally with incidents involving maritime navigation issues, aeronautical navigation issues, and even automobile navigation issues. Various means of detecting GPS spoofing have been proposed, including cryptographic methods, distortion detection, and direction-of-arrival sensing. The detection and identification methods described herein are useful in detecting and identifying known and unknown hardware trojans. These methods are also useful as a means for detecting GPS spoofing, i.e., evaluating and authenticating the integrity of the GPS signal.

Figure 13:
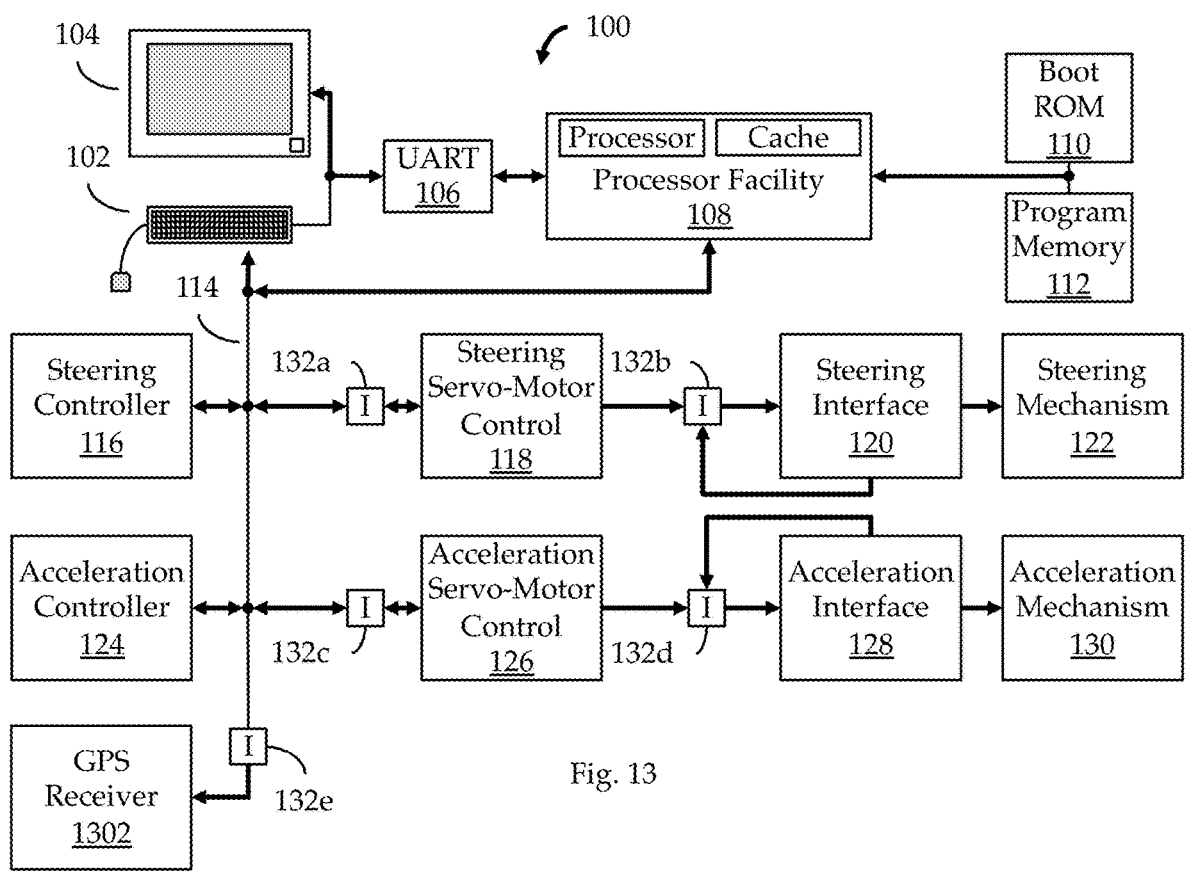
FIG. 13 illustrates, in block diagram form, the electronic facility 100 of FIG. 1 adapted to receive GPS inputs according to some embodiments.

FIG. 13 illustrates, in block diagram form, the electronic facility 100 of FIG. 1 adapted to receive GPS inputs according to some embodiments. Electronic facility 100 includes all of the previously discussed logic blocks and busses, and now includes GPS Receiver 1302, as well as a new ML instrument 132e. The infected operations of electronic facility 100 can be understood by, again, obtaining and characterizing operational data. This operational data may be obtained by way of ML instruments 132[a-e]. Similar to before, ML instruments may be instantiated within electronic facility 100 to capture data associated with the operation of the electronic facility 100. And as before, the operational data of electronic facility 100 is captured by the ML instruments 132[a-e]. This data is again received or extracted from the hardware embedded ML instruments 132[a-e] through industry standard JTAG/IJTAG and converted into usable data format and various variable fields. The process described above is utilized to detect the presence or absence of hardware trojans by applying the models developed and stored in the signature database 308 to the data extracted via JTAG/IJTAG and ML instruments 132[a-e].

Figure 14:
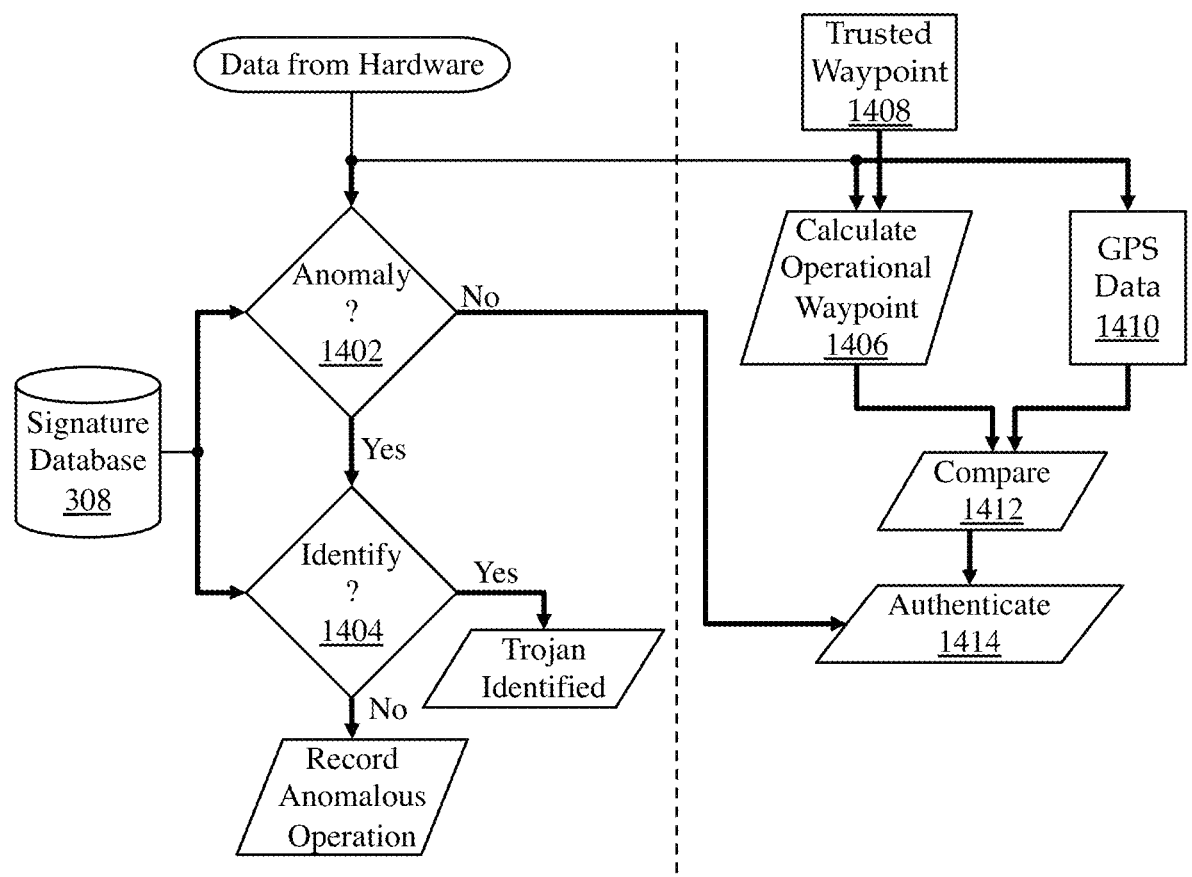
FIG. 14 illustrates, in flow diagram form, the method of utilizing the novelty detection and identification models heretofore described to authenticate the integrity of the GPS signal according to some embodiments.

FIG. 14 illustrates, in flow diagram form, the method of utilizing the novelty detection and identification models heretofore described to authenticate the integrity of the GPS signal according to some embodiments. Referring to FIG. 14, data is received from the ML instruments 132[a-e] embedded in the electronic facility 100 of FIG. 13. The data received may include, without limitation, operational navigation data, e.g., steering data, acceleration data, compass data, and GPS data such as calculated waypoints ("GPS waypoint data"), latitude and longitude data, and the like. As with the detection and identification flow chart of FIG. 10, the anomalous behavior is detected by comparing the received data to a previously determined "normal" signature or model stored in signature database 308 (see, FIG. 14, step 1402). The process continues as before, moving on to attempting to identify a detected hardware trojan (see, FIG. 14, step 1404) if anomalous behavior is detected. In parallel with this process, a last known or trusted waypoint 1408 is stored or received in support of authenticating the integrity of the GPS signal. Utilizing the trusted waypoint 1408 and a subset of the received data, e.g., the operational navigation data, the method calculates an operational waypoint as a function of the trusted waypoint 1408 and the operational navigation data (see, FIG. 14, step 1406). By way of example, if the operational navigation data indicates that the steering mechanism had zero deflection, and acceleration mechanism had a constant speed of 5 kilometers per hour, and the direction was in a 090 degree heading, then the calculation should indicate that the location is now approximately 5 kilometers east of the last trusted waypoint 1408. This system will necessarily include an error bound or error factor that is a directly related to the type of vehicle into which the system may be included, due primarily to drift caused by crosswind in aircraft, cross currents in aquatic vessels, and the like. This error bound may also be related to the accuracy of the GPS electronics included in the system. Typically, GPS system range in accuracy, e.g., few meters for mobile phone enabled applications. Expected ranges for the authentication method provided herein are ±10%. Referring back to FIG. 14, the operational waypoint 1406 is compared to GPS waypoint data 1410 at step 1412. If no anomalous behavior is determined at step 1402 and the comparison at step 1412 is within the error bound, then the authentication process returns an indication that the GPS signal and data can be trusted. If anomalous behavior is detected, then the system goes on attempt to identify the anomalous behavior as described earlier. If no anomalous behavior is detected and the comparison of the operational waypoint 1406 and the GPS waypoint and data at step 1410 is outside of the error bound, then the authentication process returns an indication that the GPS signal and data is suspect.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A method comprising the steps of:
   operating an electronic facility comprising a ML instrument by applying operational vectors, said ML instrument being adapted to store operational data associated with a first functional circuit block;
   receiving said operational data from said machine learning instrument, said operational data being further characterized as normal operational data;
   developing a normal signature as a function of said normal operational data;
   storing said normal signature in a signature database;
   inserting a first trojan into said electronic facility at a location selected to produce anomalous behavior;
   operating said electronic facility by applying operational vectors and a first trojan trigger;
   receiving said operational data from said learning instrument, said operational data being further characterized as infected operational data;
   developing an infected signature as a function of said infected operational data;
   storing said infected signature in said signature database;
   inserting a second trojan into said electronic facility at a location selected to produce anomalous behavior;
   operating said electronic facility by applying operational vectors and a second trojan trigger;
   receiving said operational data from said learning instrument, said operational data being further characterized as unknown operational data;
   detecting anomalous behavior of said unknown operational data;
   developing a prediction metric as a function of said unknown operational data, said normal signature, and said infected signature;
   storing said prediction metric in a prediction database.

2. The method of claim 1 wherein said normal operational data and the infected operational data are further characterized as comprising at least one of temperature, voltage, power consumption, supply voltage variation, ground voltage variation, and timing degradation.

3. The method of claim 1 wherein said normal operational data is further characterized as comprising XML variables.

4. The method of claim 1 wherein said normal operational data is further characterized as comprising a time tag.

5. The method of claim 1 wherein said normal operational data is further characterized as comprising a location tag.

6. A method comprising the steps of:
   operating an electronic facility in an emulator system;
   embedding a plurality of ML instruments into said electronic facility to form an instrumented pristine model
   collecting normal operational data;
   developing a normal signature as a function of said normal operational data;
   storing said normal signature in a signature database;
   inserting a first trojan into said electronic facility at a location selected to produce anomalous behavior;
   operating said electronic facility;
   collecting infected operational data;
   developing an infected signature as a function of said infected operational data;
   storing said infected operational signature in a signature database.

7. The method of claim 6 wherein said normal operational data and the infected operational data are further characterized as comprising at least one of temperature, voltage, power consumption, supply voltage variation, ground voltage variation, and timing degradation.

8. The method of claim 6 wherein said normal operational data is further characterized as comprising XML variables.

9. The method of claim 6 wherein said normal operational data is further characterized as comprising a time tag.

10. The method of claim 6 wherein said normal operational data is further characterized as comprising a location tag.

* * * * *